US012172286B1

(12) United States Patent
Harris et al.

(10) Patent No.: US 12,172,286 B1
(45) Date of Patent: Dec. 24, 2024

(54) CONTAINER TOP PUNCH APPARATUS

(71) Applicants: Bradford B. Harris, Southlake, TX (US); Chris Allen, Bastrop, LA (US)

(72) Inventors: Bradford B. Harris, Southlake, TX (US); Chris Allen, Bastrop, LA (US)

( * ) Notice: Subject to any disclaimer, the term of this patent is extended or adjusted under 35 U.S.C. 154(b) by 0 days.

(21) Appl. No.: 17/584,798

(22) Filed: Jan. 26, 2022

(51) Int. Cl.
*B25D 5/00* (2006.01)
*B26F 1/32* (2006.01)
*B67B 7/00* (2006.01)

(52) U.S. Cl.
CPC .................. *B25D 5/00* (2013.01); *B26F 1/32* (2013.01); *B67B 7/24* (2013.01); *Y10T 225/371* (2015.04)

(58) Field of Classification Search
CPC .... B67B 7/24; B67B 7/44; B67B 7/16; A62B 3/005; Y10T 225/371; Y10T 83/9423; B25D 5/00; B26F 1/32
USPC ...... 30/443, 367, 366, 358, 379, 298; 7/151; 33/670, 672, 644
See application file for complete search history.

(56) References Cited

U.S. PATENT DOCUMENTS 58,924 A * 10/1866 Webster .................. B23B 51/05 408/112
903,093 A * 11/1908 Howe ...................... B25D 3/00 254/19
1,260,264 A * 3/1918 Huszar ................. A21C 11/106 30/130
1,323,056 A * 11/1919 Hofmann ................ B25B 13/48 81/177.85
1,522,102 A * 1/1925 Cibelli ................ B23B 51/0473 408/202
1,563,574 A * 12/1925 Jensen ...................... B26F 1/32 33/644
1,663,834 A * 3/1928 Goss ......................... F41H 9/10 42/1.08

(Continued)

FOREIGN PATENT DOCUMENTS

CN 201558421 U * 8/2010
CN 103341886 A * 10/2013

(Continued)

OTHER PUBLICATIONS

KR19980043957U English Translation; Sep. 25, 1998; Kim, Kyung.*

*Primary Examiner* — Laura M Lee
(74) *Attorney, Agent, or Firm* — R. Keith Harrison

(57) ABSTRACT

A container top punch apparatus which is suitable for forming an air pressure equalization opening in a beverage or other liquid dispensing container for equalization of air pressure between the interior and exterior of the container may include an apparatus housing. A punch assembly may include a punch shaft slidably disposed in the apparatus housing. The punch shaft may be retractable in a pre-punching position in the apparatus housing and extendable from the apparatus housing to a punching position. A punch spring may be disposed in the apparatus housing. The punch spring may apply a punching force to the punch shaft and normally bias the punch shaft in the punching position. A finger lever may engage the punch shaft. The finger lever may be operable to facilitate digital retention of the punch shaft in the pre-punching position and digital release of the punch shaft for deployment of the punch shaft from the pre-punching position to the punching position via the punching force, responsive to operation of the punch spring.

18 Claims, 11 Drawing Sheets

(56) References Cited

U.S. PATENT DOCUMENTS

| | | | | | |
|---|---|---|---|---|---|
| 1,897,992 | A * | 2/1933 | Ailes | F41C 9/02 42/2 |
| 1,922,614 | A * | 8/1933 | Bradshaw | B26F 1/32 30/130 |
| 1,972,920 | A * | 9/1934 | Deuse | F25C 5/043 7/156 |
| 2,117,149 | A * | 5/1938 | Clevenger | B41F 30/00 30/358 |
| 2,220,923 | A * | 11/1940 | Trilling | B43K 8/00 33/578 |
| 2,286,088 | A * | 6/1942 | Harrell | B23B 23/02 408/97 |
| 2,384,707 | A | 9/1945 | Sweet | |
| D153,359 | S * | 4/1949 | Joyce | D8/43 |
| 2,485,877 | A * | 10/1949 | Hamilton, Jr. | A01G 3/06 173/121 |
| 2,564,256 | A * | 8/1951 | Henderhan | B23B 23/02 82/150 |
| 2,587,516 | A * | 2/1952 | Parker | B25D 5/00 33/578 |
| 2,612,222 | A * | 9/1952 | Sterba | B26F 1/3866 33/670 |
| 2,620,558 | A * | 12/1952 | Bergeron | B67B 7/24 30/443 |
| 3,075,294 | A * | 1/1963 | Strecker | B23Q 17/2275 33/644 |
| 3,172,204 | A | 3/1965 | Frey | |
| 3,315,397 | A * | 4/1967 | Gilliam | F41F 3/052 42/1.15 |
| 3,956,843 | A * | 5/1976 | Litman | F41A 21/28 42/105 |
| 4,069,586 | A * | 1/1978 | Skelton | B25D 5/00 30/360 |
| 4,319,400 | A * | 3/1982 | Chung | G01B 5/25 33/DIG. 1 |
| 4,954,025 | A * | 9/1990 | Crawford | B25F 3/00 408/239 R |
| 4,988,243 | A * | 1/1991 | Proffitt | B23G 1/48 470/900 |
| 5,791,056 | A * | 8/1998 | Messina | C03B 33/033 30/367 |
| 5,816,752 | A * | 10/1998 | Benjamin | B23B 51/0426 408/68 |
| 6,223,441 | B1 | 5/2001 | Parsons | |
| 6,418,628 | B1 * | 7/2002 | Steingass | B60R 22/32 30/367 |
| 7,284,332 | B2 | 10/2007 | Long | |
| 8,549,727 | B2 * | 10/2013 | Lee | B26F 1/32 29/566.4 |
| 8,752,456 | B1 * | 6/2014 | Turnbo | B25B 15/02 81/439 |
| 9,375,589 | B1 * | 6/2016 | Goodman | A62B 3/005 |
| 9,555,270 | B2 * | 1/2017 | Goodman | A62B 3/005 |
| 10,065,251 | B2 * | 9/2018 | Tortorella | B26F 1/32 |
| 2004/0050607 | A1 * | 3/2004 | Souther | A62B 3/005 180/271 |
| 2010/0113188 | A1 * | 5/2010 | Prickett | A63B 57/353 7/151 |
| 2014/0075764 | A1 * | 3/2014 | Cuba | B26F 1/24 30/366 |
| 2016/0346569 | A1 * | 12/2016 | Goodman | A62B 3/005 |
| 2020/0116314 | A1 * | 4/2020 | Grandadam | F21L 4/027 |

FOREIGN PATENT DOCUMENTS

| | | | | |
|---|---|---|---|---|
| CN | 205649747 | U * | 10/2016 | |
| CN | 108859152 | A * | 11/2018 | B29C 65/56 |
| KR | 19980043957 | U * | 9/1998 | B26D 3/10 |

* cited by examiner

CONTAINER TOP PUNCH APPARATUS

FIELD

Illustrative embodiments of the disclosure relate to punching apparatuses for forming openings in containers. More particularly, illustrative embodiments of the disclosure relate to a container top punch apparatus which is suitable for forming an air pressure equalization opening in a beverage or other liquid dispensing container for equalization of air pressure between the interior and exterior of the container.

SUMMARY

Illustrative embodiments of the disclosure are generally directed to a container top punch apparatus which is suitable for forming an air pressure equalization opening in a beverage or other liquid dispensing container for equalization of air pressure between the interior and exterior of the container. An illustrative embodiment of the container top punch apparatus may include an apparatus housing. A punch assembly may include a punch shaft slidably disposed in the apparatus housing. The punch shaft may be retractable in a pre-punching position in the apparatus housing and extendable from the apparatus housing to a punching position. A punch spring may be disposed in the apparatus housing. The punch spring may apply a punching force to the punch shaft and normally bias the punch shaft in the punching position. A finger lever may engage the punch shaft. The finger lever may be operable to facilitate digital retention of the punch shaft in the pre-punching position and digital release of the punch shaft for deployment of the punch shaft from the pre-punching position to the punching position via the punching force, responsive to operation of the punch spring.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper". "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 10:
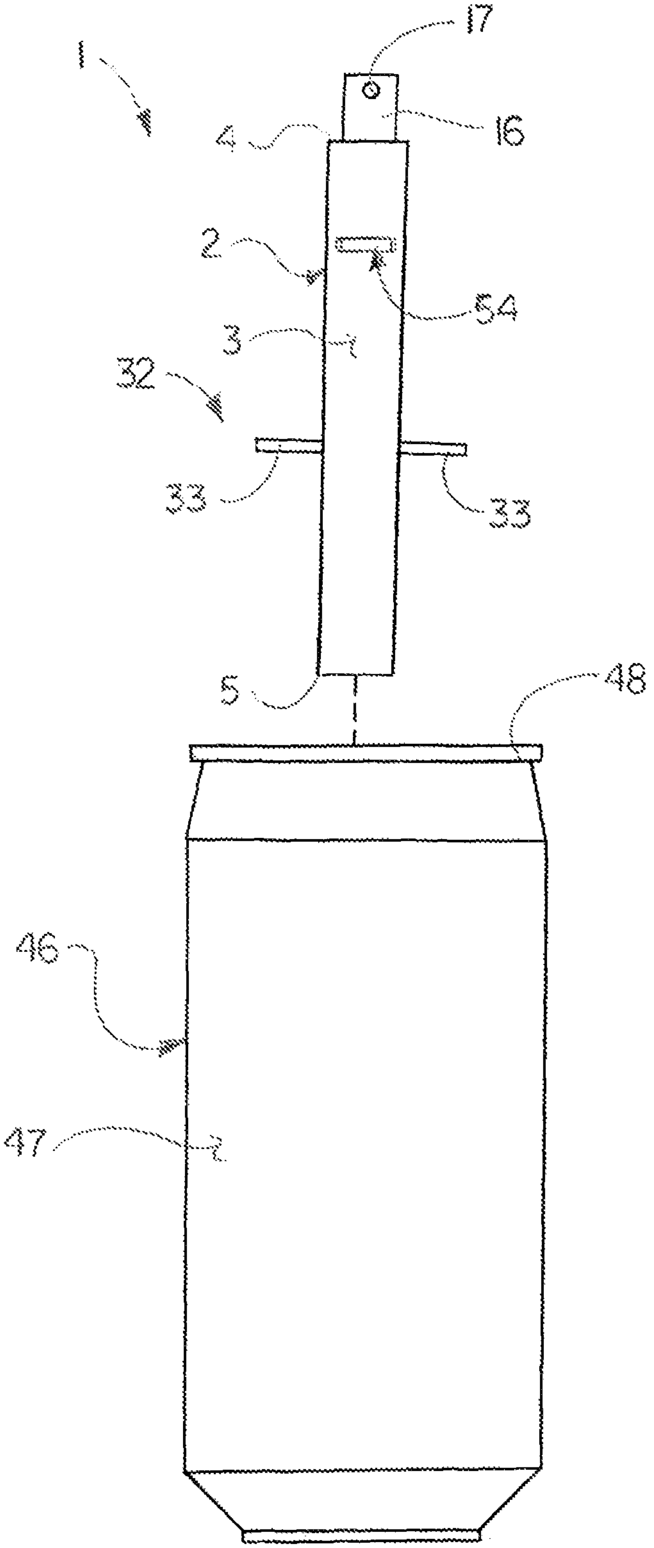
FIG. 10 is an exploded front view illustrating typical initial positioning of the illustrative container top punch apparatus over a container top of a beverage container preparatory to forming the air pressure equalization opening in the container top in typical application of the apparatus.
Figure 11:
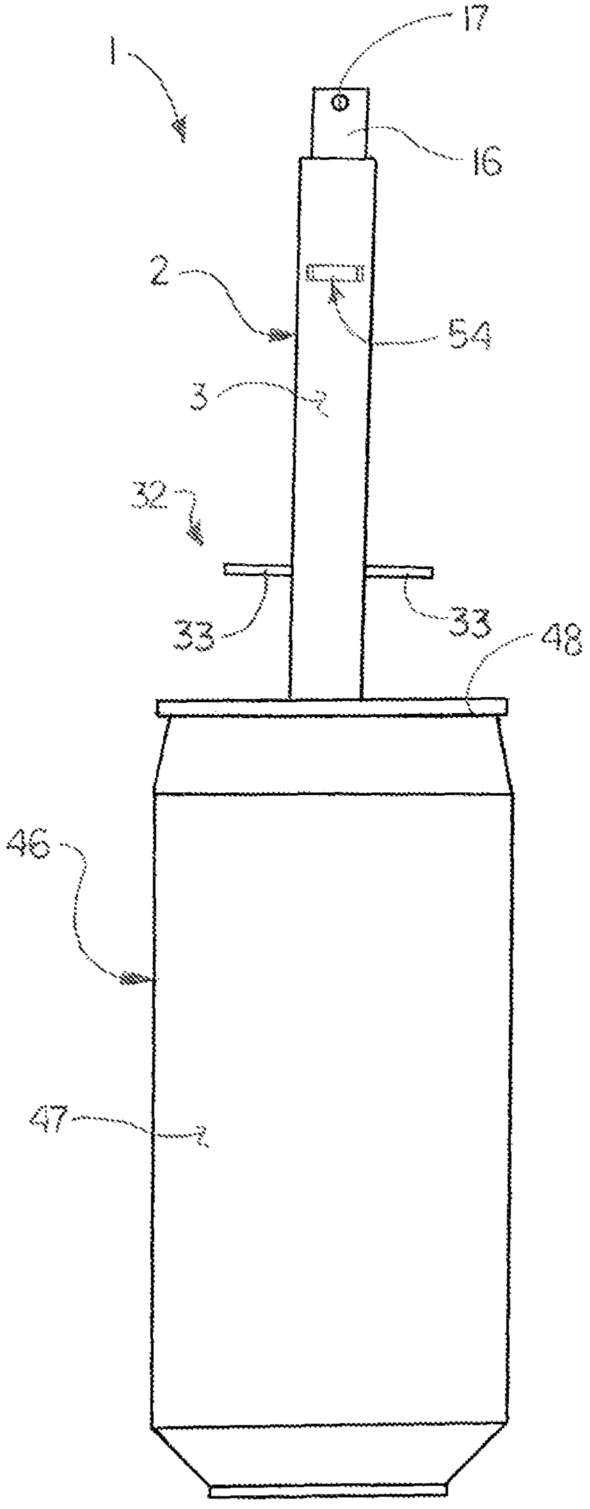
FIG. 11 is a front view of the container top punch apparatus placed against the container top of the beverage container as the air pressure equalization opening (not shown) is formed in the container top responsive to actuation of the apparatus.

Referring initially to FIGS. 10-15 of the drawings, an illustrative embodiment of the container top punch apparatus, hereinafter apparatus, is generally indicated by reference numeral 1 in FIGS. 10 and 11. As will be hereinafter described, in some applications, the apparatus 1 may be suitable for forming an air pressure equalization opening 52 (FIG. 15) in a container top 48 of a beverage container 46 such as a soda or beer can, for example and without limitation, typically for equalization of air pressure between the interior and exterior of the beverage container 46. Equalization of air pressure between the interior and exterior of the beverage container 46 may facilitate easier dispensing and flow of the liquid beverage contents from the beverage container 46 through a beverage dispensing opening 49 in the container top 48. However, it will be recognized and understood by those skilled in the art that the apparatus 1 may be used to form openings in any of a variety of containers or surfaces for any purpose which may be deemed necessary.

Figure 7:
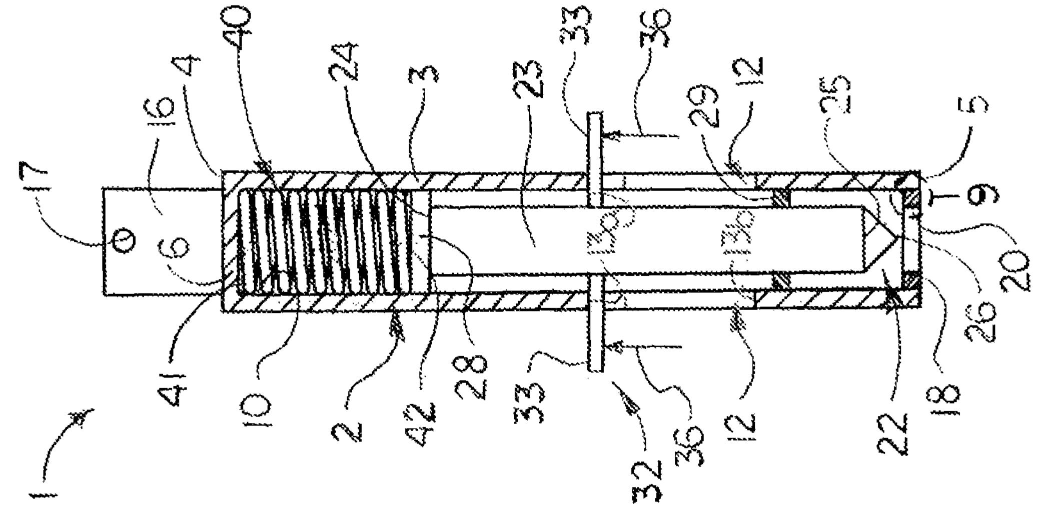
FIG. 7 is a longitudinal sectional view of the illustrative container top punch apparatus, with the punch shaft of the punch assembly disposed in a retracted, spring-loaded, pre-punching position.
Figure 6:
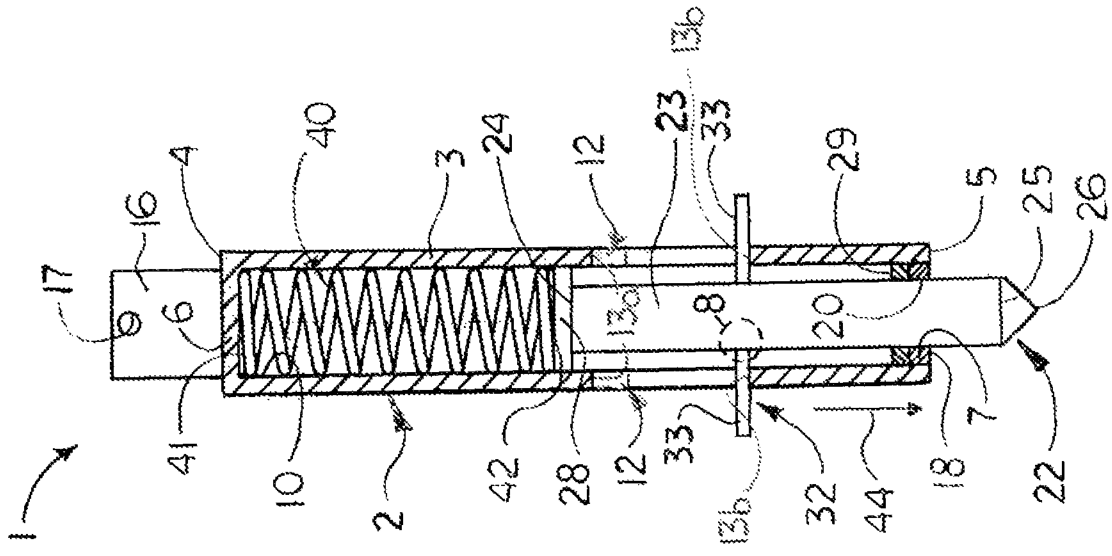
FIG. 6 is a longitudinal sectional view of the illustrative container top punch apparatus, taken along section lines 6-6 in FIG. 4, with the punch shaft of the punch assembly disposed in the extended, punching position.

Referring next to FIGS. 1-9 and 16-21 of the drawings, the apparatus 1 may include an apparatus housing 2. A punch assembly 22 may include a punch shaft 23 slidably disposed in the apparatus housing 2. Accordingly, the punch shaft 23 may be extendable from the apparatus housing 2 to a punching position, as illustrated in FIG. 6, and selectively retractable to a pre-punching position in the apparatus housing 2, as illustrated in FIG. 7. A punch spring 40 may be disposed in the apparatus housing 2. The punch spring 40 may normally apply a punching force 44 which biases the punch shaft 23 in the punching position.

Figure 9:
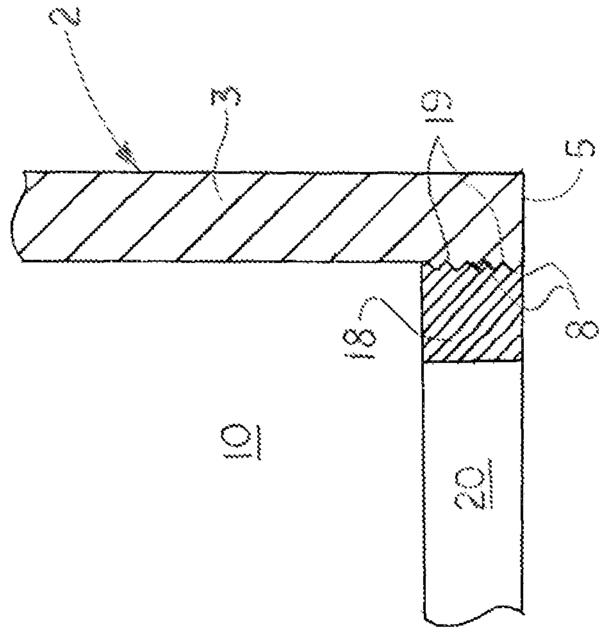
FIG. 9 is an enlarged sectional view, taken along section line 9 in FIG. 7, more particularly illustrating a typical threading technique for attaching the shaft flange stop to the apparatus housing.

As illustrated in FIGS. 6 and 7, the apparatus housing 2 may have an elongated housing sidewall 3 with a proximal housing end 4 and a distal housing end 5. A proximal housing end wall 6 may close the proximal housing end 4. The distal housing end 5 may be open at a distal housing opening 7. A housing interior 10 may extend from the proximal housing end wall 6 at the proximal housing end 4 to the distal housing opening 7 at the distal housing end 5 of the apparatus housing 2. As illustrated in FIGS. 6, 7 and 9, the housing sidewall 3 of the apparatus housing 2 at the distal housing end 5 may be blunt, flat or planar.

In some embodiments, the housing sidewall 3 of the apparatus housing 2 may be elongated, unitary and continuous from the proximal housing end 4 to the distal housing end 5. In some embodiments, the housing sidewall 3 may be cylindrical. In other embodiments, the housing sidewall 3 may have alternative shapes.

In some embodiments, a housing flange 16 may extend from the apparatus housing 2. For example and without limitation, in some embodiments, the housing flange 16 may extend from the proximal housing end wall 6 of the apparatus housing 2, as illustrated. At least one flange opening 17 may be provided in the housing flange 16. Accordingly, in some applications of the apparatus 1, the housing flange 16 may facilitate attachment of the apparatus 1 to a keychain (not illustrated) via the flange opening 17.

As further illustrated in FIGS. 6 and 7, the punch shaft 23 of the punch assembly 22 may have a proximal shaft end 24 at the punch spring 40 and a distal shaft end 25 opposite the proximal shaft end 24. A shaft base 28 may be provided on the proximal shaft end 24. A shaft tip 26 may extend from the distal shaft end 25. The shaft tip 26 may be pointed or tapered, as illustrated. In some embodiments, the punch shaft 23 may have a solid, unitary construction from the shaft base 28 to the shaft tip 26.

The punch spring 40 may have a proximal spring end 41 which engages the proximal housing end wall 6 of the apparatus housing 2 and a distal spring end 42 which is opposite the proximal spring end 41. The distal spring end 42 may engage the shaft base 28 at the proximal shaft end 24 of the punch shaft 23.

In some embodiments, the punch spring 40 may include at least one coiled spring. The coiled spring may have a unitary construction from the proximal spring end 41 to the distal spring end 42.

A finger lever 32 may engage the punch shaft 23. As illustrated in FIG. 7, the finger lever 32 may be operable to facilitate selective digital retention of the punch shaft 23 in the pre-punching position in the apparatus housing 2 upon application of digital pressure 36 to the finger lever 32 against the bias imparted by the punch spring 40 against the punch shaft 23. The digital pressure 36 may be applicable to the finger lever 32 in the direction which is toward the proximal housing end 4 and away from the distal housing end 5 of the apparatus housing 2. The finger lever 32 may additionally facilitate digital release of the punch shaft 23 for deployment of the punch shaft 23 from the pre-punching position to the punching position responsive to release of the digital pressure 36 from the finger lever 32 and via operation of the punch spring 40. Accordingly, the punch spring 40 may apply the punching force 44 (FIG. 6) against the punch shaft 23 in the direction which is toward the distal housing end 5 and away from the proximal housing end 4 to deploy the punch shaft 23 rapidly and forcefully from the pre-punching position to the punching position.

In some embodiments, the finger lever 32 may include at least one lever arm 33 which extends from the punch shaft 23 of the punch assembly 22. At least one lever slot 12 may be provided in the housing sidewall 3 of the apparatus housing 2. The lever arm 33 of the finger lever 32 may extend through the lever slot 12. In some embodiments, a pair of spaced-apart lever arms 33 may extend from the punch shaft 23. The lever arms 33 may be oriented in 180-degree relationship to each other. Accordingly, a pair of spaced-apart lever slots 12 may be provided in the housing sidewall 3. The lever slots 12 may be oriented in 180-degree relationship to each other to accommodate the respective lever arms 33.

Figure 1:
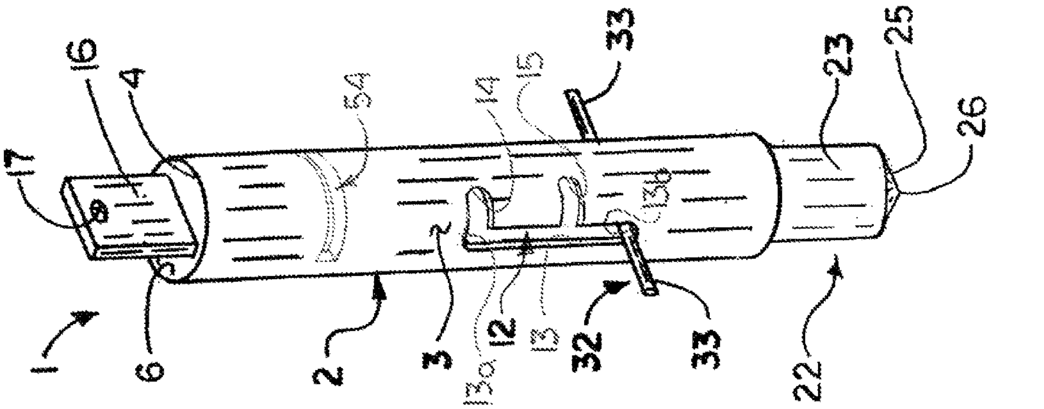
FIG. 1 is a front perspective view of an illustrative embodiment of the container top punch apparatus, with a punch shaft of the apparatus disposed in an extended, punching position.

As illustrated in FIG. 1, in some embodiments, each lever slot 12 may have an elongated main slot channel 13. The longitudinal axis of the main slot channel 13 may be oriented parallel to a longitudinal axis of the apparatus housing 2. The main slot channel 13 may have a proximal slot end 13*a* proximate the proximal housing end 4 and a distal slot end 13*b* proximate the distal housing end 5 of the apparatus housing 2. A loaded slot portion 14 may extend transversely from the main slot channel 12 at a proximal slot end 13*a*. A safety slot portion 15 may extend transversely from the main slot channel 12 between the proximal slot end 13*a* and the distal slot end 13*b*.

Figure 16:
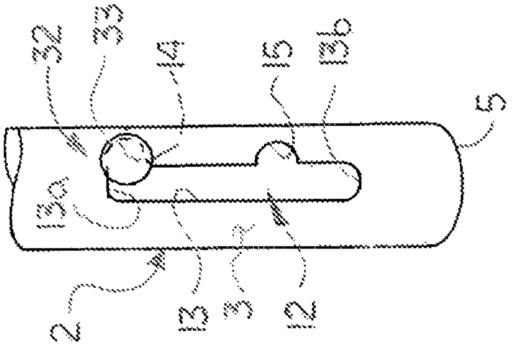
FIG. 16 is a sectioned front view of the distal housing end portion of the apparatus housing, with the finger lever of the punch assembly disposed in a loaded slot portion of a lever slot in the housing sidewall of the apparatus housing.
Figure 17:
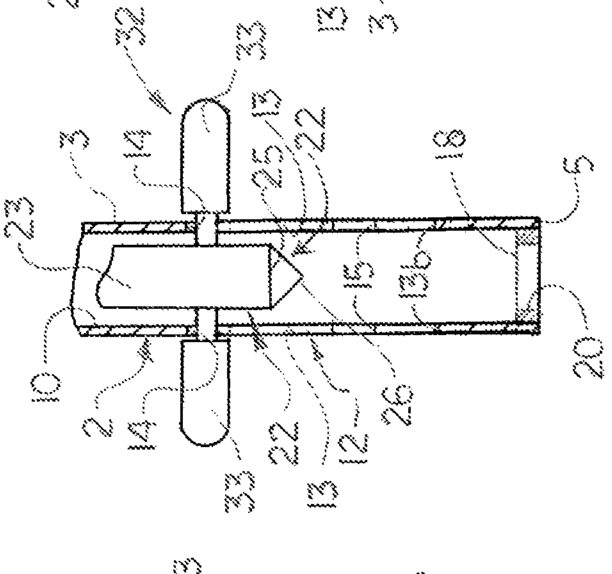
FIG. 17 is a longitudinal sectional view of the distal housing end portion of the apparatus housing illustrated in FIG. 16, with the finger lever disposed in the loaded slot portion of the lever slot and the punch shaft of the punch assembly maximally retracted into the housing interior of the apparatus housing.
Figure 18:
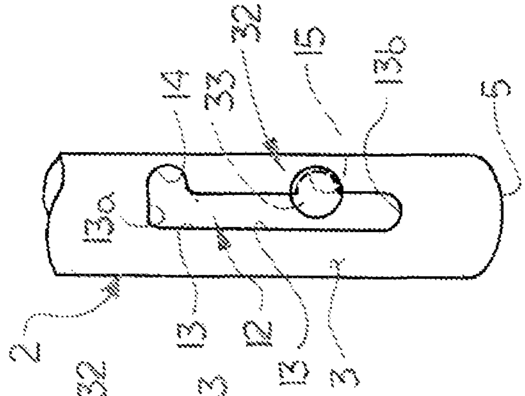
FIG. 18 is a sectioned front view of the distal housing end portion of the apparatus housing, with the finger lever disposed in a safety slot portion of the lever slot.
Figure 19:
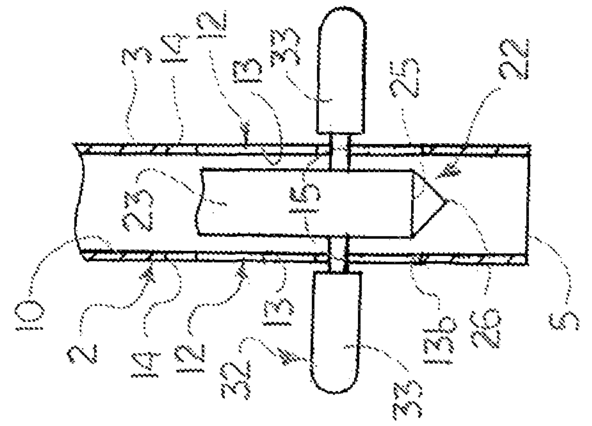
FIG. 19 is a longitudinal sectional view of the distal housing end portion of the apparatus housing illustrated in FIG. 18, with the finger lever disposed in the safety slot portion of the lever slot and the punch shaft of the punch assembly minimally retracted into the housing interior of the apparatus housing in a safety position.
Figure 21:
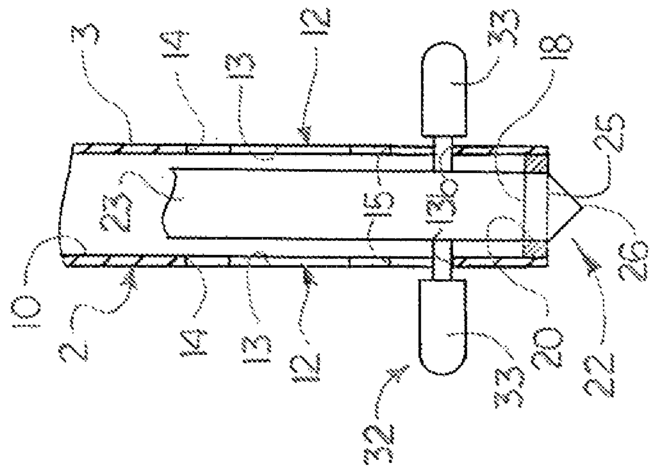
FIG. 21 is a longitudinal sectional view of the distal housing end portion of the apparatus housing illustrated in FIG. 20, with the finger lever disposed in the distal slot end of the lever slot and the punch shaft of the punch assembly extending from the housing interior of the apparatus housing in the punching position.
Figure 20:
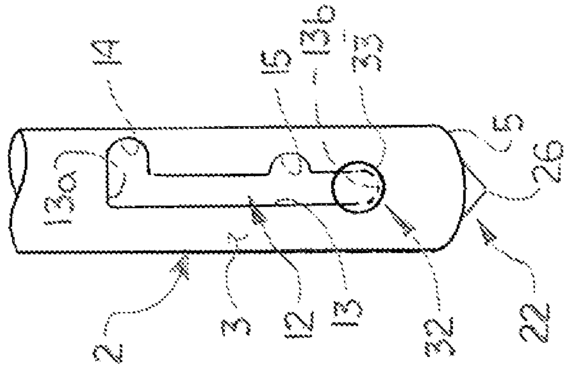
FIG. 20 is a sectioned front view of the distal housing end portion of the apparatus housing, with the finger lever disposed in a distal slot end of the lever slot in the housing sidewall of the apparatus housing as the punch shaft of the punch assembly is fully extended from the apparatus housing in the extended, punching position.

As illustrated in FIGS. 16-21, the finger lever arms 33 of the finger lever 32 may be positional in the loaded slot portions 14 or the safety slot portions 15 of the lever slots 12 to maintain the punch shaft 23 of the punch assembly 22 in a retracted position in the housing interior 10 of the apparatus housing 2. Accordingly, as illustrated in FIGS. 16 and 17, the finger lever arms 33 of the finger lever 32 may be placed in the loaded slot portions 14 of the respective lever slots 12 to maintain the punch shaft 23 in the maximally-retracted position in the housing interior 10. Alternatively, as illustrated in FIGS. 18 and 19, the finger lever arms 33 of the finger lever 32 may be placed in the safety slot portions 15 of the respective lever slots 12 to maintain the punch shaft 23 in a minimally-retracted safety position. Accordingly, when the container top punch apparatus 1 is not in use, the punch shaft 23 may be stored in the maximally retracted position or the minimally retracted position to maintain the shaft tip 26 of the punch shaft 23 in a retracted configuration with respect to the distal housing end 5 of the apparatus housing 2 for safety purposes. As illustrated in FIGS. 20 and 21, in the fully extended punching position of the punch shaft 23, the finger lever arms 33 of the finger lever 32 may engage or seat against the distal slot end 13*b* of the main slot channel 13 of the lever slot 12.

Figure 8:
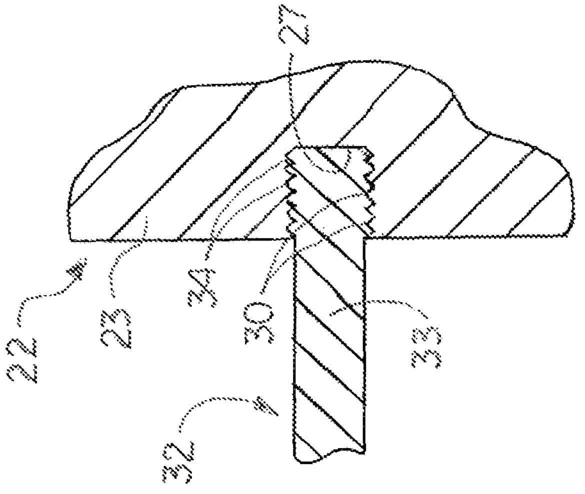
FIG. 8 is an enlarged sectional view, taken along section line 8 in FIG. 6, more particularly illustrating a typical threading technique for attaching each finger lever arm of the finger lever to the punch shaft of the punch assembly.

Each finger lever arm 33 of the finger lever 32 may be attached to the punch shaft 23 of the punch assembly 22 according to the knowledge of those skilled in the art. Accordingly, as illustrated in FIG. 8, in some embodiments, a lever arm opening 27 may extend transversely into each side of the punch shaft 23 for each corresponding finger lever arm 33. Interior lever arm opening threads 30 may be provided in each lever arm opening 27. Exterior arm threads 34 may be provided on each finger lever arm 33. The arm threads 34 on each finger lever arm 33 may threadably engage the companion interior lever arm opening threads 30 in each corresponding lever arm opening 27. In some embodiments, the finger lever arms 33 of the finger lever 32 may be casted or molded in one piece with the punch shaft 23, or may be welded and/or otherwise attached to the punch shaft 23 according to the knowledge of those skilled in the art.

Figure 3:
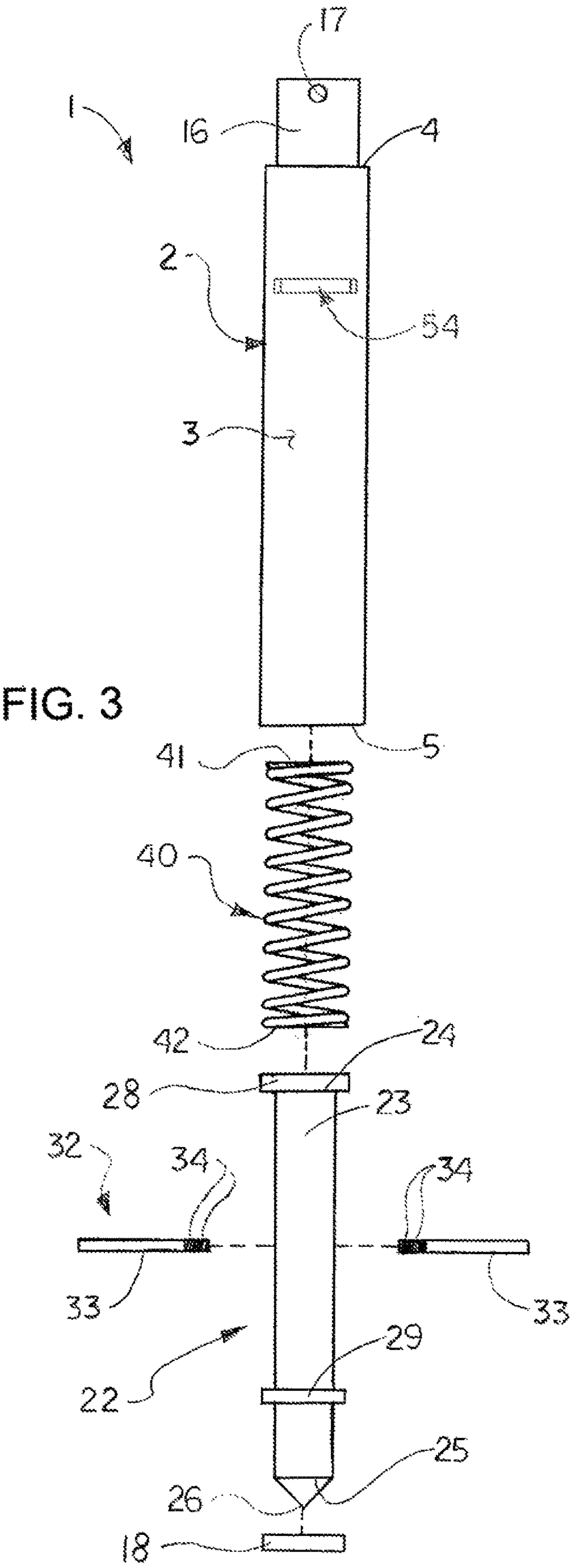
FIG. 3 is an exploded front view of the illustrative container top punch apparatus.
Figure 5:
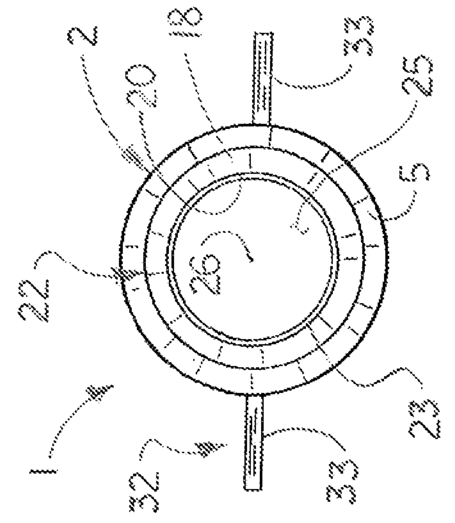
FIG. 5 is a bottom view of the illustrative container top punch apparatus.
Figure 4:
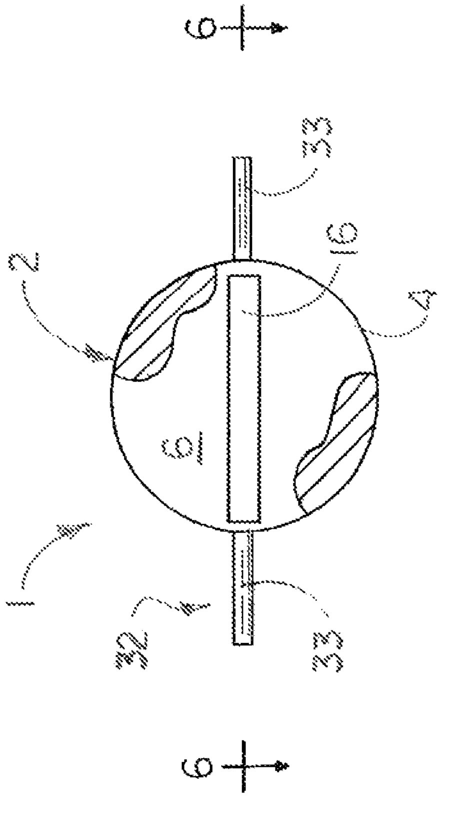
FIG. 4 is a top view of the illustrative container top punch apparatus.

As illustrated in FIGS. 3, 6 and 7, in some embodiments, a shaft flange 29 may extend circumferentially from the punch shaft 23 of the punch assembly 22. A shaft flange stop 18 may be provided on the apparatus housing 2. As illustrated in FIGS. 6 and 7, the shaft flange stop 18 may have a shaft opening 20 which registers with the punch shaft 23. The shaft opening 20 may accommodate the punch shaft 23 as the punch shaft 23 deploys from the pre-punching position (FIG. 7) to the punching position (FIG. 6) in the housing interior 10. Accordingly, as illustrated in FIG. 6, in the punching position of the punch shaft 23, the shaft flange 29 may engage the shaft flange stop 18 to limit extension of the punch shaft 23 from the apparatus housing 2.

The shaft flange stop 18 may be attached to the housing sidewall 3 of the apparatus housing 2 according to the knowledge of those skilled in the art. Accordingly, as illustrated in FIG. 9, in some embodiments, distal housing threads & may extend from the interior surface of the housing sidewall 3 into the housing interior 10 at the distal housing end 5. Exterior flange stop threads 19 may extend from the shaft flange stop 18. The flange stop threads 19 on the shaft flange stop 18 may threadably engage the companion distal housing threads 8 on the housing sidewall 3 to secure the shaft flange stop 18 to the housing sidewall 3. In some embodiments, the shaft flange stop 18 may be casted or molded in one piece with the housing sidewall 3, or may be welded and/or otherwise attached to the housing sidewall 3 according to the knowledge of those skilled in the art.

Figure 2:
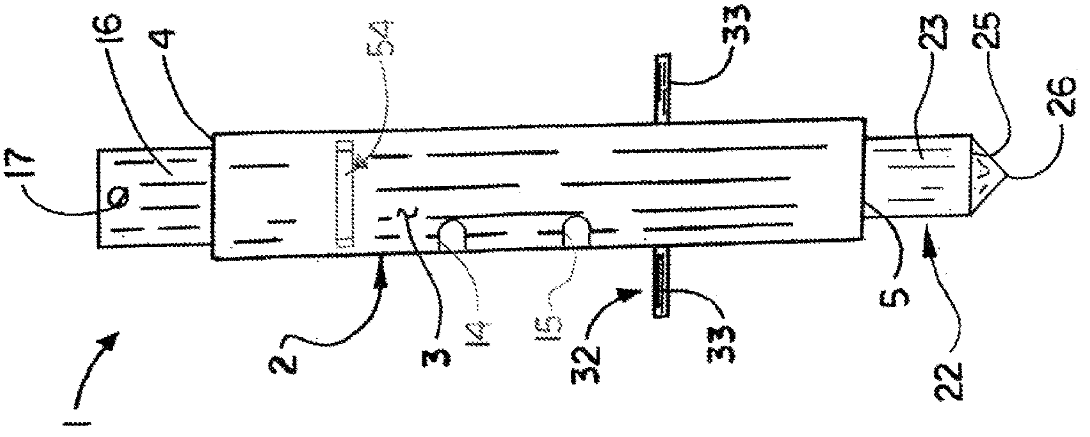
FIG. 2 is a front view of the illustrative container top punch apparatus.

As illustrated in FIGS. 1-3, in some embodiments, at least one bottle opener slot 54 may extend through the housing sidewall 3 of the apparatus housing 2. The bottle opener slot 54 may be oriented transverse to the longitudinal axis of the apparatus housing 2, as illustrated. In some applications of the apparatus 1, the bottle opener slot 54 may facilitate removal of a bottle cap (not illustrated) from a beverage-containing bottle by inserting the edge of the bottle cap into the bottle opener slot 54 and pulling the apparatus 1 outwardly at an angle away from the bottle.

The apparatus housing 2, punch assembly 22 and other components of the apparatus 1 may be constructed of metal, plastic, composite materials and combinations thereof using casting, molding, machining and/or other fabrication techniques known by those skilled in the art.

Figure 15:
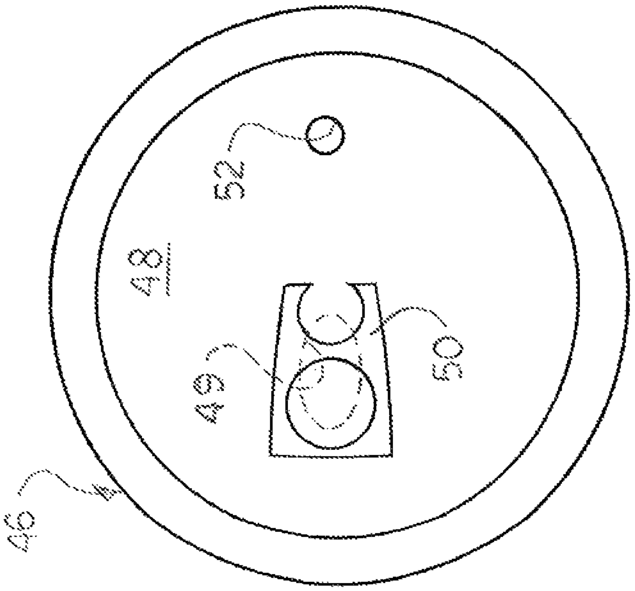
FIG. 15 is a top view of the beverage container with the air pressure equalization opening in the container top after use of the apparatus.

In typical application, the apparatus 1 may be used to form an air pressure equalization opening 52 (FIG. 15) in a container top 48 of a beverage container 46. The beverage container 46 may be, for example and without limitation, a soda or beer can having a typically aluminum container sidewall 47 with the container top 48 on the container sidewall 47. As illustrated in FIG. 15, a detachable tab 50 may initially be attached to the container top 48 to cover and seal a beverage dispensing opening 49 in the container top 48. The tab 50 may be selectively detached from the container top 48 to unseal, open and expose the beverage dispensing opening 49 for drinking or dispensing of the liquid beverage from the beverage container 46, typically in the conventional manner. In some applications, the apparatus 1 may be attached to a keyring (not illustrated) by extending the keyring through the flange opening 17 in the housing flange 16.

The apparatus 1 may be used to punch the air pressure equalization opening 52 in the container top 48 typically for equalization of air pressure between the interior and exterior of the beverage container 46. Equalization of the interior air pressure with the exterior air pressure may facilitate easier dispensing and flow of the liquid beverage contents from the beverage container 46 through the beverage dispensing opening 49 than would otherwise be possible. Accordingly, as illustrated in FIG. 6, the punch spring 40 may normally bias and maintain the punch shaft 23 in the punching position such that the punch shaft 23 extends through the shaft opening 20 in the shaft flange stop 18 and the shaft tip 26 protrudes beyond the distal housing end 5 of the apparatus housing 2. The shaft flange 29 on the punch shaft 23 may engage the shaft flange stop 18 in the apparatus housing 2 to limit extension of the shaft flange 29 beyond the distal housing end 5, with the finger lever arms 33 of the finger lever 32 typically seating against the distal slot end 13*b* of the main slot channel 13 of the lever slot 12. Alternatively, when the container top punch apparatus 1 is not in use, the punch shaft 23 may be stored in the maximally retracted position (FIGS. 16 and 17) or the minimally retracted safety position (FIGS. 18 and 19) to maintain the shaft tip 26 of the punch shaft 23 in a retracted configuration with respect to the distal housing end 5 of the apparatus housing 2 for safety purposes.

An operator (not illustrated) of the apparatus 1 may initially hold the apparatus 1 in one hand with the index finger and the middle finger on the holding hand typically positioned beneath the respective finger lever arms 33 of the finger lever 32. As illustrated in FIG. 7, the operator may then apply the digital pressure 36 against the respective finger lever arms 33 of the finger lever 32 in the direction of the proximal housing end 4 of the apparatus housing 2. Accordingly, the finger lever 32 may slidably displace the punch shaft 23 in the housing interior 10 from the punching position illustrated in FIG. 6, against the bias imparted against the punch shaft 23 by the punch spring 40, to the pre-punching position illustrated in FIG. 7, typically until the finger lever arms 33 of the finger lever 32 seat against the proximal slot end 13*a* of the main slot channel 13 of the lever slot 12.

Figure 13:
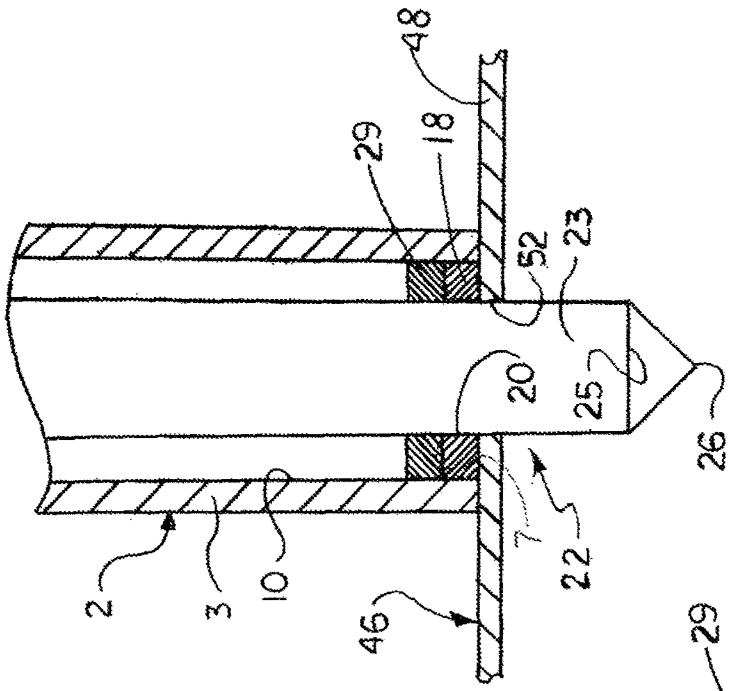
FIG. 13 is an enlarged sectional view of the container top and apparatus housing of the apparatus, with the punch shaft of the punch assembly extending through the container top of the beverage container to form the air pressure equalization opening in the container top as the punch shaft of the punch assembly is digitally released and deployed from the retracted, pre-punching position to the extended, punching position.
Figure 14:
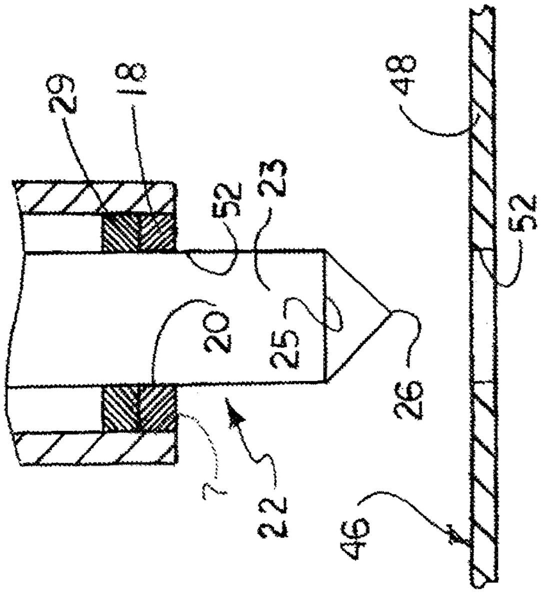
FIG. 14 is an enlarged sectional view of the container top and the apparatus housing of the apparatus, with the apparatus removed from the container top after formation of the air pressure equalization opening.
Figure 12:
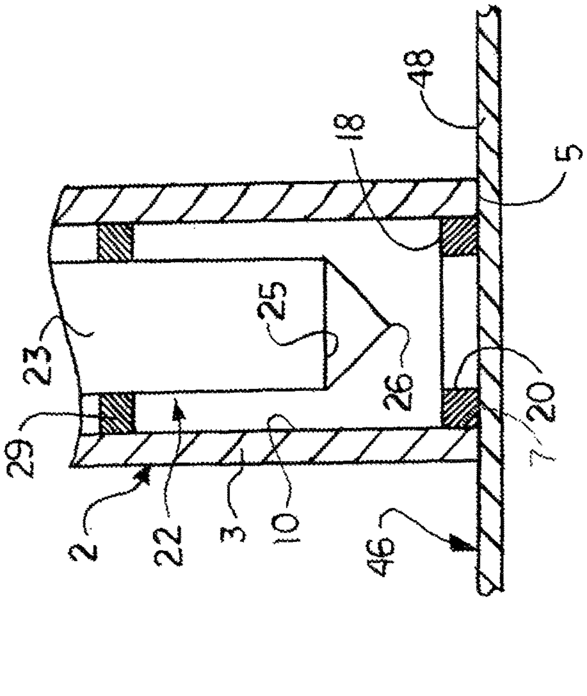
FIG. 12 is an enlarged sectional view of the container top punch apparatus placed against the container top of the beverage container, with the punch shaft of the punch assembly disposed in the finger-actuated, retracted, pre-punch configuration in the apparatus housing.

As illustrated in FIG. 10, while maintaining the digital pressure 36 (FIG. 7) against the finger lever 32, the operator may position the apparatus 1 over the container top 48 of the beverage container 46. As illustrated in FIGS. 11 and 12, the operator may then place the distal housing end 5 of the apparatus housing 2 against the container top 48 at the location or position at which the air pressure equalization opening 52 is to be made. The operator may next digitally release the finger lever 32 such that the punch spring 40 continues to apply the punching force 44 (FIG. 6) to the shaft base 48 of the punch shaft 23 and forcefully and rapidly slidably displaces the punch shaft 23 in the housing interior 10 from the pre-punching position back to the punching position. As it is thus deployed, the punch shaft 23 may extend through the shaft opening 20 in the shaft flange stop 18 such that the shaft tip 26 initially impinges against and then penetrates the container top 48 of the beverage container 46, thereby forming the air pressure equalization opening 52 in the container top 48, as illustrated in FIG. 13. The distal housing end 5 of the apparatus housing 2 may then be removed or disengaged from the container top 48 of the beverage container 46, as illustrated in FIG. 14. The liquid beverage may be dispensed or drank from the beverage container 46 through the beverage dispensing opening 49 (FIG. 15). Accordingly, the newly formed air pressure equalization opening 52 may equalize the air pressures in the interior and exterior of the beverage container 46 to facilitate dispensing of the liquid beverage from the beverage container 46. In some applications of the apparatus 1, the bottle opener slot 54 may facilitate removal of a bottle cap (not illustrated) from a beverage-containing bottle, typically as was heretofore described.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A container top punch apparatus, comprising:

an apparatus housing having a housing sidewall with a proximal housing end and a blunt, flat or planar distal housing end, a distal housing opening at the distal housing end and a pair of spaced-apart lever slots in the housing sidewall on opposite sides of the apparatus housing;

each of the pair of spaced-apart lever slots comprising:

an elongated main slot channel oriented parallel to a longitudinal axis of the apparatus housing, the main slot channel having a proximal slot end proximate the proximal housing end and a distal slot end proximate the distal housing end of the apparatus housing;

a loaded slot portion extending transversely from the main slot channel at the proximal slot end; and a safety slot portion extending transversely from the main slot channel between the proximal slot end and the distal slot end;

a punch assembly comprising:

a solid, unitary punch shaft slidably disposed in the apparatus housing, the punch shaft retractable in a pre-punching position in the apparatus housing and extendable from the apparatus housing to a punching position, the punch shaft extending through the distal housing opening and protruding beyond the distal housing end of the apparatus housing in the pre-punching position;

a unitary punch spring disposed in the apparatus housing, the punch spring having a proximal spring end at the proximal housing end of the housing sidewall and a distal spring end engaging the punch shaft and applying a punching force to the punch shaft and normally biasing the punch shaft in the punching position; and a finger lever engaging the punch shaft, the finger lever comprising a pair of spaced-apart finger lever arms extending from the punch shaft on opposite sides of the punch shaft and extending through the pair of spaced-apart lever slots, respectively, the finger lever operable to facilitate digital deployment of the punch shaft from the punching position to the pre-punching position, digital retention of the punch shaft in the pre-punching position and digital release of the punch shaft for deployment of the punch shaft from the pre-punching position to the punching position via the punching force responsive to operation of the punch spring, the finger lever positional in a selected one of the loaded slot portion and the safety slot portion of each corresponding one of the pair of spaced-apart lever slots and wherein engagement of the finger lever arms of the finger lever with the loaded slot portions and the safety slot portions maintain the punch shaft of the punch assembly in first and second retracted positions, respectively, in the housing interior of the apparatus housing and engagement of the finger lever arms of the finger lever with the distal slot end maintain the punch shaft in an extended punching position.

2. The container top punch apparatus of claim 1 wherein the lever slots are oriented in 180 degree relationship to each other in the housing sidewall of the apparatus housing, and wherein the finger lever arms of the finger lever are oriented in 180 degree relationship to each other on the punch shaft of the punch assembly.

3. The container top punch apparatus of claim 1 further comprising a housing flange extending from the proximal housing end of the apparatus housing and at least one flange opening in the housing flange.

4. The container top punch apparatus of claim 1 further comprising a shaft flange on the punch shaft and a shaft flange stop on the apparatus housing, and wherein the shaft flange engages the shaft flange stop in the punching position of the punch shaft to limit extension of the punch shaft beyond the distal housing end of the apparatus housing in the punching position of the punch shaft.

5. The container top punch apparatus of claim 1 wherein the housing sidewall of the apparatus housing is elongated and has a housing interior extending from the proximal housing end to the distal housing end, and wherein the punch shaft of the punch assembly is retracted into the housing interior in the pre-punching position of the punch shaft and the punch shaft extends from the housing interior beyond the distal housing end in the punching position of the punch shaft.

6. The container top punch apparatus of claim 1 wherein the punch shaft of the punch assembly comprises a proximal shaft end at the punch spring, a distal shaft end opposite the proximal shaft end and a shaft tip extending from the distal shaft end.

7. The container top punch apparatus of claim 1 wherein the punch spring comprises at least one coiled spring.

8. A container top punch apparatus, comprising:

an apparatus housing having an elongated housing sidewall with a proximal housing end, a blunt, flat or planar distal housing end, a proximal housing end wall closing the proximal housing end, a distal housing opening at the distal housing end, a housing interior extending from the proximal housing end wall to the distal housing opening and a pair of spaced-apart lever slots in the housing sidewall on opposite sides of the apparatus housing;

each of the pair of spaced-apart lever slots comprising:

an elongated main slot channel oriented parallel to a longitudinal axis of the apparatus housing, the main slot channel having a proximal slot end proximate the proximal housing end and a distal slot end proximate the distal housing end of the apparatus housing;

a loaded slot portion extending transversely from the main slot channel at the proximal slot end; and a safety slot portion extending transversely from the main slot channel between the proximal slot end and the distal slot end; and a punch assembly comprising:

a solid, unitary punch shaft slidably disposed in the apparatus housing, the punch shaft retractable in a pre-punching position in the housing interior of the apparatus housing and extendable from the housing interior through the distal housing opening beyond the distal housing end of the housing sidewall to a punching position;

a unitary punch spring disposed in the apparatus housing and engaging the proximal housing end wall, the punch spring having a proximal spring end engaging the proximal housing end wall at the proximal housing end of the housing sidewall and a distal spring end engaging the punch shaft and applying a punching force to the punch shaft and normally biasing the punch shaft in the punching position;

a finger lever engaging the punch shaft, the finger lever protruding from the housing interior of the apparatus housing and operable to facilitate digital deployment of the punch shaft from the punching position to the pre-punching position, digital retention of the punch shaft in the pre-punching position and digital release of the punch shaft for deployment of the punch shaft from the pre-punching position to the punching position via the punching force responsive to operation of the punch spring, the finger lever comprising a pair of spaced-apart finger lever arms extending from the punch shaft on opposite sides of the punch shaft and extending through the pair of spaced-apart lever slots, respectively;

the finger lever arms of the finger lever deployable in the loaded slot portion of each corresponding one of the pair of spaced-apart lever slots and wherein engagement of the loaded slot portions and the finger lever arms of the finger lever maintain the punch shaft in a first retracted position in the housing interior;

the finger lever arms of the finger lever deployable in the safety slot portion of each corresponding one of the pair of spaced-apart lever slots and wherein engagement of the safety slot portions and the finger lever arms of the finger lever maintain the punch shaft in a second retracted safety position in the housing interior; and the finger lever arms of the finger lever engageable against the distal slot end of the main slot channel of each corresponding one of the pair of spaced-apart lever slots in an extended punching position of the punch shaft.

9. The container top punch apparatus of claim 8 wherein the lever slots are oriented in 180 degree relationship to each other in the housing sidewall of the apparatus housing, and wherein the finger lever arms of the finger lever are oriented in 180 degree relationship to each other on the punch shaft of the punch assembly.

10. The container top punch apparatus of claim 8 further comprising a housing flange extending from the proximal housing end wall of the apparatus housing and at least one flange opening in the housing flange.

11. The container top punch apparatus of claim 8 further comprising a shaft flange on the punch shaft and a shaft flange stop on the apparatus housing at the distal housing end, and wherein the shaft flange engages the shaft flange stop in the punching position of the punch shaft to limit extension of the punch shaft beyond the distal housing end of the apparatus housing in the fully extended punching position of the punch shaft.

12. The container top punch apparatus of claim 8 wherein the punch shaft of the punch assembly comprises a proximal shaft end at the punch spring, a distal shaft end opposite the proximal shaft end and a shaft tip extending from the distal shaft end.

13. The container top punch apparatus of claim 8 wherein the punch spring comprises at least one coiled spring.

14. A container top punch apparatus, comprising:

an apparatus housing having an elongated, unitary, continuous housing sidewall with a proximal housing end, a blunt, flat or planar distal housing end, a proximal housing end wall closing the proximal housing end, a distal housing opening at the distal housing end, a housing interior extending from the proximal housing end wall to the distal housing opening and at least one lever slot extending through the housing sidewall;

the at least one lever slot comprising:

an elongated main slot channel oriented parallel to a longitudinal axis of the apparatus housing, the main slot channel having a proximal slot end proximate the proximal housing end and a distal slot end proximate the distal housing end of the apparatus housing;

a loaded slot portion extending transversely from the main slot channel at the proximal slot end; and a safety slot portion extending transversely from the main slot channel between the proximal slot end and the distal slot end;

at least one bottle opener slot extending through the housing sidewall of the apparatus housing; and a punch assembly comprising:

a solid, unitary punch shaft having a proximal shaft end, a distal shaft end, a shaft base at the distal shaft end and a shaft tip extending from the distal shaft end, the punch shaft slidably disposed in the apparatus housing and retractable in a pre-punching position in the housing interior of the apparatus housing and extendable from the housing interior through the distal housing opening beyond the distal housing end of the housing sidewall to a punching position;

a unitary, coiled punch spring disposed in the apparatus housing, the punch spring having a proximal spring end engaging the proximal housing end wall of the apparatus housing and a distal spring end opposite the proximal spring end and engaging the shaft base of the punch shaft, the punch spring applying a punching force to the punch shaft and normally biasing the punch shaft in the punching position;

a finger lever engaging the punch shaft, the finger lever protruding from the housing interior of the apparatus housing through the at least one lever slot and operable to facilitate digital deployment of the punch shaft from the punching position to the pre-punching position, digital retention of the punch shaft in the pre-punching position and digital release of the punch shaft for deployment of the punch shaft from the pre-punching position to the punching position via the punching force responsive to operation of the punch spring;

the finger lever deployable in the loaded slot portion of the at least one lever slot and wherein engagement of the loaded slot portions and the finger lever arms of the finger lever maintain the punch shaft in a first retracted position in the housing interior;

the finger lever deployable in the safety slot portion of the at least one lever slot and wherein engagement of the safety slot portions and the finger lever arms of the finger lever maintain the punch shaft in a second retracted safety position in the housing interior; and the finger lever engageable against the distal slot end of the main slot channel of the at least one lever slot in an extended punching position of the punch shaft;

a shaft flange on the punch shaft of the punch assembly; and a shaft flange stop on the apparatus housing at the distal housing end, the shaft flange engages the shaft flange stop in the punching position of the punch shaft to limit extension of the punch shaft beyond the distal housing end of the apparatus housing in the fully extended punching position of the punch shaft.

15. The container top punch apparatus of claim 14 wherein the finger lever comprises at least one lever arm extending from the punch shaft through the housing interior and the at least one lever slot.

16. The container top punch apparatus of claim 15 wherein the at least one lever arm comprises a pair of spaced-apart lever arms extending from the punch shaft and oriented in 180-degree relationship to each other, and the at least one lever slot comprises a pair of spaced-apart lever slots in the housing sidewall and oriented in 180-degree relationship to each other.

17. The container top punch apparatus of claim 14 further comprising a housing flange extending from the proximal housing end wall of the apparatus housing and at least one flange opening in the housing flange.

18. The container top punch apparatus of claim 14 wherein the housing sidewall of the apparatus housing is cylindrical.

* * * * *